Dec. 6, 1949

C. L. CHRIST ET AL 2,490,674

DEVICE FOR PRECISION RECORDING OF X-RAY
DIFFRACTION PATTERNS
Filed July 13, 1948

INVENTORS
CHARLES L. CHRIST,
EDMUND F. CHAMPAYGNE,
BY
Robert Ames Norton
ATTORNEY Patented Dec. 6, 1949

2,490,674

UNITED STATES PATENT OFFICE 2,490,674

DEVICE FOR PRECISION RECORDING OF X-RAY DIFFRACTION PATTERNS

Charles L. Christ, Old Greenwich, and Edmund Francis Champaygne, Noroton Heights, Conn., assignors to American Cyanamid Company, New York, N. Y., a corporation of Maine Application July 13, 1948, Serial No. 38,424

4 Claims. (Cl. 346—33)

1

This invention relates to an improved recorder for instruments using Geiger counters and similar counting circuits.

A number of recording instruments utilizing circuits in which bursts of radiant energy are counted have achieved widespread use. Many of these circuits use a Geiger counter and are applicable to such instruments as X-ray diffraction spectrometers, X-ray diffraction photometer, electron diffraction devices and the like. Instruments which use circuits that count individual units of radiation such as electrons, photons, and the like operate reliably when the radiation is sufficiently intense so that the number of quanta of radiation are large enough to give statistical uniformity. However, it is often important to make measurements with precision where the number of quanta or other units of energy is sufficiently small so that statistical laws no longer apply and the effect of radiation discontinuity and randomness of arrival of quanta at a counting detector become large enough in relation to the measurement to affect seriously the precision of the measurement.

The problems to which the present invention is directed are well illustrated by the typical X-ray diffraction spectrometer in which a Geiger counter and associated amplifying circuits are slowly moved across and scan diffraction lines produced by X-rays impinging on the material the diffraction pattern of which is to be measured. Strong diffraction lines produce a high density of quanta of X-radiation striking the Geiger counter, receiving for amplification in a current or voltage which can actuate a typical recorder if the recording surface is moved in accordance with time as the counter scans the diffraction pattern. The lines will be represented by peaks. The strong lines can be measured with a high degree of precision because the number of quanta per second striking the Geiger counter, and hence the number of counts, is so large that the radiation dis-continuity and randomness is completely masked to give a high statistical uniformity. Relatively weak lines in the diffraction pattern, however, correspond to so few quanta that the randomness of their emission becomes appreciable in comparison with the total amount of radiation received over a short period of time. The precision with which the measurement of these weak lines can be made falls off rapidly. In fact, in extreme cases the random effect which gives a wavering base line in the recorder may completely mask the existence of a weak diffraction line. This seriously limits the usefulness of the instrument which cannot be used except with patterns having sufficiently strong diffraction line. Similar problems arise with other types of instruments used in electron diffraction and other operations where precise measurement of radiation is necessary even when the radiation is very weak.

The present invention removes the disadvantages by substituting a different type of measurement in which the points of a recording curve are measured from a reference line of 100% deflection rather than from an uncertain or wavering base line of low radiation and because each point registered by said instrument corresponds to the same number of counts and therefore to the same probable error, the measurement of radiation differences thus becomes substantially the same for weak radiation changes as for strong peaks and instruments using counting circuits become applicable for the precise measurement of radiation levels which hitherto could not be explored with recording instruments.

Essentially, the present invention applies the amplified pulses from a counter circuit, such as a Geiger counter circuit, and then if desired through a suitable scaling circuit periodically to a suitable switch. For example, this may be a rotary switch which is advanced step by step as each count reaches it. Depending on the type of measurement, the switch may be closed every 10 impulses, every 100 impulses, or even in some extreme cases, a much larger number. One contact of the switch is connected to a source of D. C. voltage which may be a battery, regulated power supply or the like, the other end of the power supply normally being grounded in accordance with conventional practice. The other switch contact leads to one plate of a capacitor, the other plate being grounded and the capacitor shunted by a resistance to produce a time constant sufficiently great so as to correspond to the time interval between switch operations for the minimum rate of counts to be measured. The discharge of a capacitor through a resistor varies exponentially, however, for a considerable time at the beginning the discharge curve does not depart substantially from a straight line. The term "time constant" used in the present specification and claims is intended to be limited to the time during which the condenser discharge curve approximates a straight line. The high potential side of the capacitor is connected to a recorder of conventional design. The closing of the switch charges the condenser and causes the recording element of the recorder to move to a position corresponding to 100% response. When the switch then opens, the charge on the capacitor slowly leaks off to ground through the resistor and the recording element moves along a diagonal line down toward zero position following the voltage drop on the capacitor. If an amount of radiation above the zero level is being received, the switch will again close before all of the charge has leaked off the capacitor and the recording element will then move back to the point of 100% response. This is repeated and a record results which is composed of a series of closely spaced saw tooth traces, the spacing being closer and the length of the traces being shorter where large amounts of radiation are encountered. A curve which is an envelope of the traces forming their lower boundary line then constitutes the record. The precision for a small peak of radiation, so long as it is above the zero level, will be the same as for the large one and a straight and uniform zero line results. Precision measurements are possible over a much wider range of radiation intensity and recording instruments utilizing counter circuits can be employed with radiation energies far below those which could be accurately recorded before.

The invention will be described in greater detail in conjunction with the drawings in which.

Figure 1:
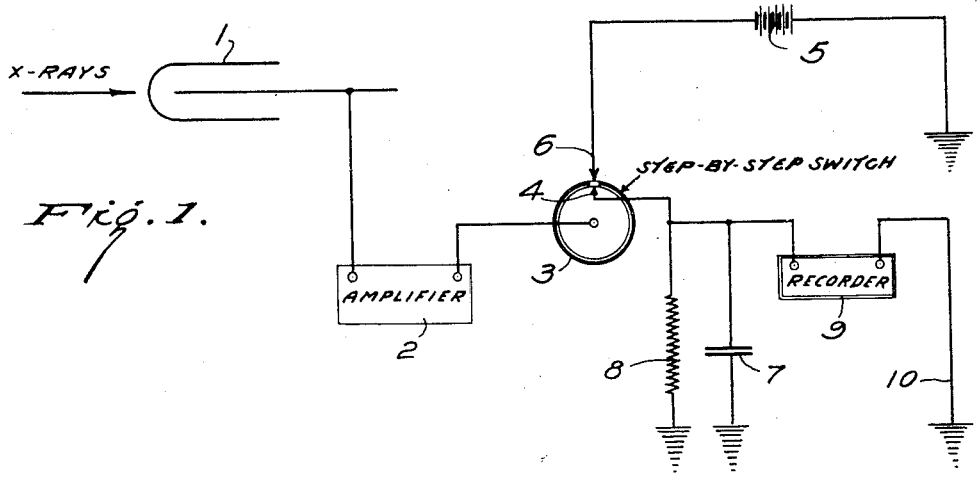
Fig. 1 is a schematic representation of a typical circuit.

In the circuit in Fig. 1, a Geiger counter tube 1 receives radiation. For example, it can be moved to scan an X-ray diffraction pattern. The source of the radiation is not shown as it forms no part of the present invention. As each quantum strikes the Geiger tube, a pulse is produced and amplified by the amplifier 2, the output of which drives a rotating switch or register 3 which is provided with a suitable contact element 4 which makes contact at one point of the revolution between a source of D. C. voltage shown schematically as a battery 5 and a lead 6 connected to one end of a capacitor 7 and resistor 8 and also leading to the input of a conventional recorder 9. The other side of the input, as is usual, is grounded through the lead 10. The capacitor 7 and resistance 8 are both grounded at one side.

The rotating switch or register 3 may be moved by a suitable step by step mechanism of conventional design actuated by the output of the amplifier. In most cases in order to give suitable range to the motion, the amplifier includes a scanning circuit so that the output surges come after a predetermined number of quanta have struck the Geiger tube.

Figure 2:
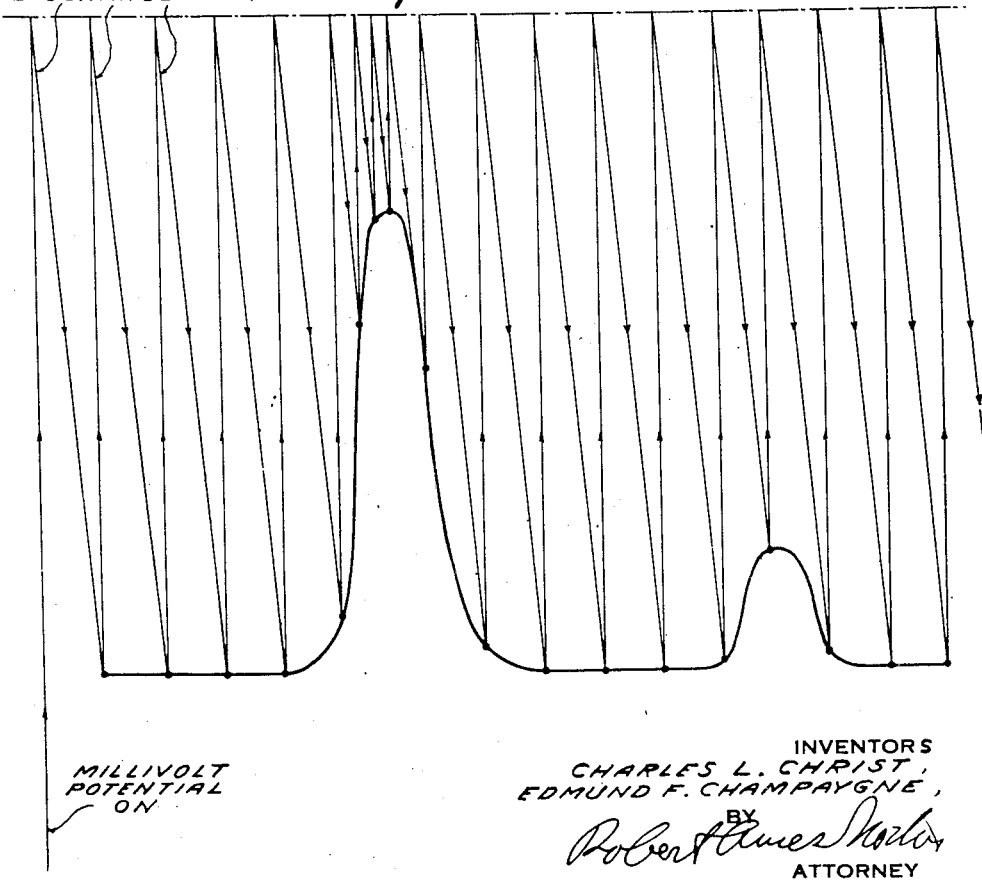
Fig. 2 is a typical recorder trace.

The value of the resistor 8 and the capacitor 7 are chosen so as to give a time constant about equal to the time for one revolution of the register 3 at a radiation intensity corresponding to a predetermined zero figure. If the radiation is at zero, the recorder element will trace a diagonal line down to the zero position, springing back to the 100% response position whenever the switch is closed. A series of saw tooth traces results as is shown in Fig. 2. These traces are spread out where the radiation is low and come closer together where a higher radiation results in a much more rapid revolution of the switch 3. In such cases only a small part of the capacitor charge leaks off to ground before the switch is closed again. The envelope of the low points of the traces constitutes the curve corresponding to radiation. In Fig. 2 no attempt is made to reproduce an exact trace in a normal recorder. This is intended to be schematic and show all of the individual traces clearly. In an actual device the traces are very close together at points corresponding to high radiation. The drawing, however, is not to scale and shows them sufficiently spaced for clearness.

If the curve were drawn by the ordinary type of recording instrument, for example, a North American Phillips recording X-ray spectrometer, the measurement of the high peak near the middle of Fig. 2 would be made with substantially the same precision as in the case where the device of the present invention is used because the radiation would result in so many quanta striking the Geiger tube that true statistical uniformity results. However, the zero line would not be a straight line but would waver because of random bursts of radiation and would be represented by a circuitous line showing ripples of a magnitude which, for instance, might correspond to one tenth of the small peak at the right. In such a case, the precision of measurement of the high peak would be about 2% whereas that of the low peak would be only 10%, and in the case of a still lower peak this might be completely masked by ripples in the base line. In the case of the present invention, however, the base line for zero radiation is perfectly straight and is determined only by the time constant of the capacitor 7 and resistor 8. Therefore, any radiation over the minimum corresponding to a slow rotation of the switch 3 results in a response greater than the zero level and will record a true peak. The record will be substantially as accurate for the very small peak as for the very large peak. It is thus possible to measure, for instance in an X-ray diffraction spectrometer, very weak lines which are completely masked by the random effect of the radiation energy at low energy levels.

The features of the present invention have been described in conjunction with an X-ray diffraction spectrometer in which the counter tube physically scans a pattern. The horizontal movement of the recording surface in Fig. 2, therefore, corresponds to scanning movement of the tube and line intensity is plotted against position. Other instrument utilizing counter tubes and counter circuits may require a plotting of intensity with respect to other parameters such as time. In each case, the present invention permits operating with substantially the same high precision at very low levels that is possible with higher levels in devices used hitherto. In every case, the time constant of resistor and capacitor must be chosen in accordance with the desired zero energy level. This is determined for each use, but once determined, remains fixed and the precision of measurement does not depend on factors changing in the circuit except, of course, that the voltage applied to the switch must be maintained constant within reasonable limits which is a simple matter.

It should be noted that the present invention may be used to record very slowly and in great detail. For example, in the case of an electron diffraction pattern which is ordinarily recorded photographically, the intensity of the electron radiation in certain portions of the pattern may be extremely low. The present invention permits the scanning of such a pattern at an extraordinarily slow rate so that measurement may be obtained of lines which would ordinarily be lost in the background. Where extremely slow scanning of a pattern is used, the switch will ordinarily be given a much shorter response time because there are limits to the time constant obtainable with resistances and capacitors of practical values. It is an advantage of the present invention that it can be applied to fast counters or slow counters without loss in the precision of the instrument.

A mechanical switch has been shown as an illustration in the diagrammatic representation in Fig. 1. For many operations, such as for instance in an X-ray diffraction spectrometer, this presents marked advantages. It is, of course, possible to design an electronic switch in which successive impulses build up a charge on a condenser connected to an electron tube of a thyratron type which fires and therefore causes the energy pulse corresponding to mechanical closure of a switch only after a predetermined voltage level is reached. Such electrical storing circuits are well known and are known to be the equivalent of mechanical switches. The present invention is not concerned with the particular design of the switch. In fact, it is an advantage that the circuit may be applied to any of the well known switch designs and the art is therefore not restricted to any particular switch type.

We claim:

1. A radiation recording device comprising in combination a radiation detector giving electrical pulse responses to a small, finite number of quanta of radiation, an amplifier for amplifying said electric pulses, a voltage actuated electric recorder provided with a moving surface and a recording element movable thereover to trace a mark thereon, an electrical switch having two circuit connections, means for closing said switch intermittently, said means being actuated by a predetermined number of amplified electric responses from the amplifier, a source of voltage connected to one circuit connection of the switch, the other circuit connection being connected to the input circuit of the electric recorder, said input circuit containing a resistance and capacity network having a time constant approximating the period of switch operation for a predetermined minimum rate of amplified pulses, a low resistance path connecting the switch to the capacity portion of the network, the switch-closing means providing a closed period sufficiently long to permit charging of the network capacity substantially to the voltage of the source, whereby the actuation of the switch produces a predetermined maximum movement of the recording element of the electric recorder.

2. A recorder according to claim 1 in which the switch is mounted on a rotary step by step register actuated by the amplified signals from the amplifier.

3. A recorder according to claim 2 in which the detector is a Geiger counter tube.

4. A recorder according to claim 1 in which the detector is a Geiger counter tube.

CHARLES L. CHRIST.
EDMUND FRANCIS CHAMPAYGNE.

REFERENCES CITED

The following references are of record in the file of this patent:

UNITED STATES PATENTS

| Number | Name | Date |
|---|---|---|
| 2,265,966 | Gebauer | Dec. 9, 1941 |
| 2,412,234 | Turner, Jr. | Dec. 10, 1946 |

OTHER REFERENCES

Article on Use of Geiger-Muller Counters from "Radiology," vol. 27; 1936 pages 149-157.